United States Patent [19]

Wentz

[11] 4,331,387
[45] May 25, 1982

[54] ELECTRO-OPTICAL MODULATOR FOR RANDOMLY POLARIZED LIGHT

[75] Inventor: John L. Wentz, Ellicott City, Md.

[73] Assignee: Westinghouse Electric Corp., Pittsburgh, Pa.

[21] Appl. No.: 166,266

[22] Filed: Jul. 3, 1980

[51] Int. Cl.³ .............................................. G02F 1/03
[52] U.S. Cl. ................................. 350/384; 350/385; 350/356; 372/12; 372/26; 372/99; 372/100; 372/108
[58] Field of Search ............... 350/376, 384, 385, 392, 350/356; 331/94.5 Q

[56] References Cited

U.S. PATENT DOCUMENTS

| | | | |
|---|---|---|---|
| 2,745,316 | 5/1956 | Sziklai | 350/171 |
| 3,400,992 | 9/1968 | McNaney | |
| 3,517,982 | 6/1970 | Fonda-Bonardi | 350/356 |
| 3,713,032 | 1/1973 | Wentz | |
| 3,719,414 | 3/1973 | Wentz | |
| 3,767,287 | 10/1973 | Von Hundelshausen | |
| 3,818,373 | 6/1974 | Chun et al. | 331/94.5 Q |
| 3,823,998 | 7/1974 | Yazaki | |
| 3,879,687 | 4/1975 | Daehlin et al. | |
| 3,910,680 | 10/1975 | Kokada | |

*Primary Examiner*—R. A. Rosenberger
*Attorney, Agent, or Firm*—W. E. Zitelli

[57] ABSTRACT

Electro-optical apparatus for modulating a randomly polarized light beam is disclosed. The apparatus includes an electro-optical cell and a plurality of optical elements configured to polarize the randomly polarized light beam into two light beam components and to guide the light beam components along two respectively corresponding sets of optical paths, a portion of each set of optical paths passing colinearly through a predetermined axis of the electro-optical cell. Each set of paths are combined to reform an associated portion of the randomly polarized light beam which is exited at a corresponding exit surface of the apparatus, the reformed exited portion, in each case, being a function of the energization of the electro-optical cell. In one application, the electro-optical apparatus is disposed in the optical cavity of a laser system and operative therein as a Q modulator wherein the Q of the laser cavity is dependent on the energization level of the electro-optical cell.

19 Claims, 16 Drawing Figures

ELECTRO-OPTICAL MODULATOR FOR RANDOMLY POLARIZED LIGHT

BACKGROUND OF THE INVENTION

The present invention relates to light modulation systems in general, and more particularly to an electro-optical system for electronically controlling the modulation of a randomly polarized light beam.

Light valves or modulators utilizing electro-optical crystal elements for modulating linearly polarized light beams are generally well known as evidenced by the U.S. Pat. Nos. 3,400,992 issued to McNaney; 3,767,287 issued to von Hundelshausen; 3,823,998 issued to Yazaki; 3,879,687 issued to Daehlin et al.; and 3,910,680 issued to Kakeda. Moreover, examples of improved aspects of proposed optical systems of this type which have been applied to laser apparatus may be found in the U.S. Pat. Nos. 3,429,636 and 3,713,032, both issued to the same inventor and assigned to the same assignee as the present application. The electro-optical system of U.S. Pat. No. 3,713,032 permits modulation of the output light beam coupling of a laser by electronically controlling the voltage potential applied to the electro-optical crystal cell included therein. And, the electro-optical system of U.S. Pat. No. 3,429,636 provides for light modulation with two electro-optical crystal cells aligned in tandem along the optical axis to provide for a lower modulation voltage potential for inducing birefringence therein.

Apparently, all of the aforementioned systems are directed to the modulation of linearly polarized light. In some cases, especially when modulating light in a laser optical cavity, it is preferred that randomly or unpolarized light be used during the resonating cycle. For this reason, other electro-optical modulation configurations have been proposed. One such proposed system, for example, is disclosed in the U.S. Pat. No. 3,719,414 issued to the same inventor and assigned to the same assignee as the present application.

More specifically, with regard to a system of the type described in U.S. Pat. No. 3,719,414, a birefringent crystal, preferably calcite, an electro-optical crystal, and another birefringent crystal may be aligned along an optical axis in a tandem configuration. A randomly polarized light beam, projected along the optical axis and incident to the first birefringent crystal, may be split into two orthogonal component rays as it passes through the first birefringent crystal. The electro-optical crystal, in the unenergized state, passes the orthogonally polarized rays unaltered to the second birefringent crystal which is configured to recombine the orthogonally polarized rays to reform the randomly polarized beam along the optical axis at the output thereof. At times when the electro-optical crystal is energized, the orthogonally polarized rays passing therethrough may be polarization modulated such that the respective polarization axes are rotated by 90°, for example, and then passed through the second birefringent crystal. As a result of the 90° rotation of the plane of polarization, the rays are no longer recombined at the output of the second birefringent crystal, but are spatially separately, generally along paths which are parallel and equidistant from the optical axis at the output of the second birefringent crystal.

When this principle of birefraction modulation is applied to a laser optical cavity, for example, the second birefringent crystal may be replaced with a totally reflective mirror as depicted in the U.S. Pat. No. 3,719,414. In this configuration, the reflected orthogonally polarized beams from the mirror may be passed back through the electro-optical crystal and depending on the state of said crystal the two beams may either be recombined along the optical axis as they pass through the birefringent crystal and thereafter may be returned to a laser rod from which they were emitted compositely as a randomly polarized beam or the two beams may remain separated as they pass through the birefringent crystal and may be directed away from the laser rod.

Thus, the operation of this type of electro-optical system is one of Q-switching a randomly polarized light beam in a laser optical resonant cavity. That is, when the electro-optical crystal is unenergized, the randomly polarized light beam may be reflected and returned to its laser source in a high Q transmission state and upon energization, the light beam is diverted from its laser source resulting in a low Q transmission state. Note that the operation of the electro-optical system is independent of the light beam polarization.

In these systems, the birefringent crystals, which offer the characteristics of double refraction to the orthogonally polarized component rays of a randomly polarized light beam, are presently very expensive. In the case in which calcite is used as the birefringent crystal, the present cost may be as high as $7,000.00 per crystal needed. In addition, the electro-optical crystal utilized therein must be made of a physical size that its aperture be capable of accommodating the outside dimensions of the two parallel rays of light provided thereto from the birefringent crystal. Moreover, either a mirror or an additional birefringent crystal is required to provide reflection or recombination, respectively, of the orthogonally polarized component rays of the light beam. In addition to these expenses, the formation of the orthogonally polarized light rays provide undesirable thermal optic effects in the crystal elements which may cause non-uniform heating therein, that is, heat in being generated in two places primarily in the areas where the two beams of light are concentrated.

In conclusion, it appears from the viewpoint of expense, performance and configuration, that a system more compact, in terms of alignment, using less costly elements and providing for the same or better performance by offering a similar function of modulating a randomly polarized light beam would provide a viable improved alternative to the present type systems. Thus, it is the intention of the specification here following to describe such an embodiment for the electro-optical modulation of a randomly polarized light beam.

SUMMARY OF THE INVENTION

In accordance with one aspect of the present invention, electro-optical apparatus is operative electronically to modulate a randomly polarized beam of light projected along an optical axis from a source of coherent light. More specifically, the electro-optical apparatus comprises an electro-optical cell which operates in an energized state to modulate the polarization of a light beam passing through a predetermined axis thereof, preferably its longitudinal axis; and a plurality of optical elements which are configured for polarizing the randomly polarized light beam, incident thereupon along the optical axis, into first and second light beam components having first and second planes of polarization, respectively. The first and second components are guided through the electro-optical cell colinearly along the predetermined axis thereof. The optical element configuration further combines first predetermined amounts of the first and second light beam components which have passed through the electro-optical cell to reform and exit a first predetermined amount of the randomly polarized light beam along a first axis therefrom, and continues second predetermined amounts of the first and second light beam components which have passed through the electro-optical cell to reform and exit a second predetermined amount of the randomly polarized light beam along a second axis therefrom.

In another aspect of the present invention, a laser system has the Q of its optical cavity electronically modulated utilizing the aforementioned electro-optical apparatus which is included as an element therein. More specifically the laser system comprises a laser rod, positioned longitudinally along an optical axis, for generating a beam of randomly polarized coherent light along the optical; a jumping means for stimulating the laser rod to a predetermined energy level; a total reflection mirror disposed along the optical axis a first predetermined distance from a first end of the laser rod; and the electro-optical apparatus, operative as a Q modulator, disposed along the optical axis a second predetermined distance from a second end of the laser rod. Further included in the laser system is a means for energizing electronically the electro-optical cell of the electro-optical apparatus to a predetermined energization state commensurate with a desired polarization modulation level of the light beams passing therethrough. Moreover, in this aspect of the present invention, the reformed first predetermined amount of the randomly polarized light beam is reflected back to the laser rod along the optical axis and the recombined second predetermined amount of the randomly polarized light beam is transmitted along another axis away from the laser rod. The reflected first and transmitted second predetermined amounts of the randomly polarized light beam are formed as a function of the polarization modulation level of the electro-optical cell, whereby the Q of the laser optical cavity, which is dependent on the amount of radomly polarized light reflected back along the optical axis to the laser rod, is modulated by the electronically energized state of the electro-optical cell.

DESCRIPTION OF THE PREFERRED EMBODIMENTS

In the present text, applicant's invention is directed to an electro-optical apparatus which is operative electronically to modulate a randomly polarized beam of light which may also be termed an unpolarized beam of light. The beam of light may be projected along an optical axis from a source of coherent light and be incident to the electro-optical apparatus at an entrance aperture. For the purposes of describing the principles of applicant's invention, two embodiments will be described herebelow. To gain a greater appreciation for the spatial configuration of the electro-optical apparatus, three dimensional sketches of the preferred alternate embodiments are exhibited in FIGS. 1 and 8, respectively. In each case, to describe the apparatus in more detail a cross-sectional view along the cut AA is presented for each embodiment in FIGS. 2 and 8, respectively.

Figure 2:
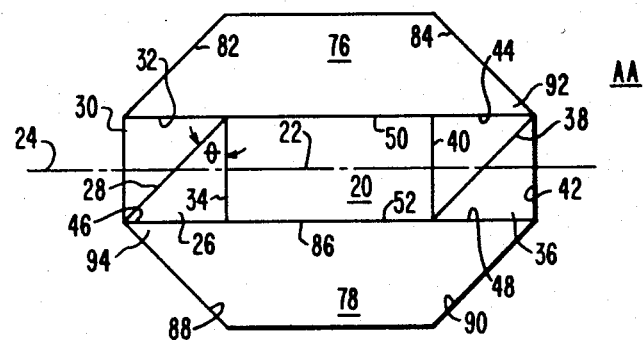
FIG. 2 is a cross-sectional diagram of the embodiment depicted in FIG. 1 as viewed along an AA cut.

Referring to FIG. 2, the first embodiment includes a conventional electro-optical cell 20 which is operative in an energized state to modulate the polarization of a light beam passing along the longitudinal axis 22 thereof. The remaining plurality of optical elements shown surrounding the electro-optical cell 20 are configured for polarizing a randomly polarized light beam, incident thereupon along the optical axis 24, into first and second light beam components (not shown) having first and second planes of polarization, respectively, and for guiding the first and second components through the electro-optical cell 20 colinearly along the longitudinal axis 22 thereof which may be in-line with the optical axis 24 for the present embodiment.

More specifically, a first beam splitting/combining polarizer 26 may be disposed in tandem with the electro-optical cell 20 along the optical axis 24. The first polarizer 26 may have a polarizing incidence surface 28 therein which may be inclined with respect to the optical axis 24 at a predetermined polarization angle $\theta$, which may be, for the present embodiment, in the order of 45°, for example. A first surface 30 of the first polarizer 26 provides an entrance aperture for the randomly polarized light beam projected along the optical axis 24. A second surface 32 thereof provides an aperture for exiting the first light beam component which may be reflected from the polarizing surface 28. A third surface thereof which may be disposed substantially parallel to the first surface 30 provides for an exit aperture for the second light beam component which may be transmitted through the polarizing surface 28 along the optical axis 24.

A second beam splitter/combiner polarizer 36 may also be configured in tandem with the electro-optical cell 20 at another end thereof along the optical axis 24. The second polarizer 36 may also have a polarizing incidence surface 38 therein which is inclined substantially parallel to the incidence surface 28 of the first polarizer 26. The second polarizer 36 may also include first 40 and third 42 surfaces which are aligned in similar orientation to the surfaces 30 and 34 of the first polarizer 26. Moreover, a second surface 44 of the second polarizer may be oriented in the same plane substantially as the second surface of the first polarizer 26. In addition, the first and second polarizers 26 and 36 may also include fourth surfaces 46 and 48, respectively, which may be oriented substantially in the same plane and may be aligned parallel to the surfaces 32 and 44, respectively.

Conventionally, the beam splitter/combiners of 26 and 36 comprise a combination of prisms assembled to form the polarizing incidence surfaces 28 and 38, respectively. Generally, thin-film dielectric coatings are applied to the interface surfaces at 28 and 38 to provide prespecified polarization properties. In general, these polarizers 26 and 36 are conventional commercially available units commonly referred to as "polarizing beam splitter cubes". Typical dimensions may be on the order of 10 mm for each side of the cube, for example.

Figure 6:
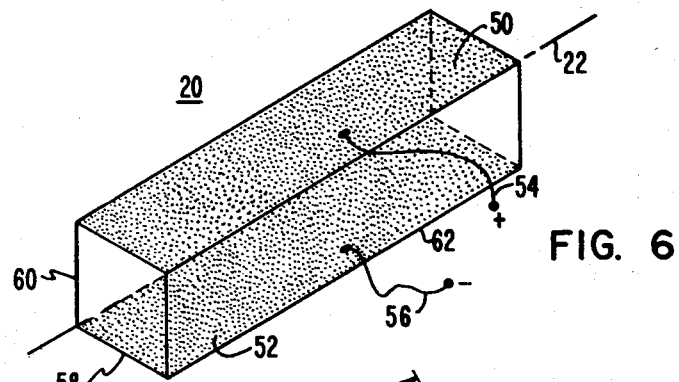
FIGS. 6 and 7 are illustrations depicting two types of electro-optical cells suitable for use in the embodiments of the present invention.

The electro-optical cell 20 may be either of the conventional transverse-modulation type, similar to the device depicted schematically in FIG. 6 which is described in greater detail in the aforementioned-referenced U.S. Pat. No. 3,429,636, or a conventional longitudinal-modulation type, similar to the device depicted in FIG. 7 which is a sketch of a Steinmetz cell, for example. With regard to the transverse electro-optical modulator sketched in FIG. 6, for example, conductive surfaces 50 and 52 may have electrical connections 54 and 56 respectively coupled thereto. In this configuration, the electro-optical cell 20 may be energized to a predetermined energization state by applying a desired voltage across the terminals 54 and 56 by any well-known conventional means. The polarization modulation effected by the electro-optical cell 20 is usually commensurate with the voltage potential applied thereacross. In one example, the conductive surfaces 50 and 52 may be provided by vacuum depositing a metallic gold material thereon; and in another example, a silver conductive paint may be applied to the surfaces 50 and 52. In the present embodiments of FIGS. 1 and 8, the parallelopiped structure as shown in FIG. 6 is used. Typical dimensions of the parallelopiped cell 20 may on the order of 10 millimeters for each of the sides 58 and 60, and 20 millimeters for the side 62, for example.

Figure 1:
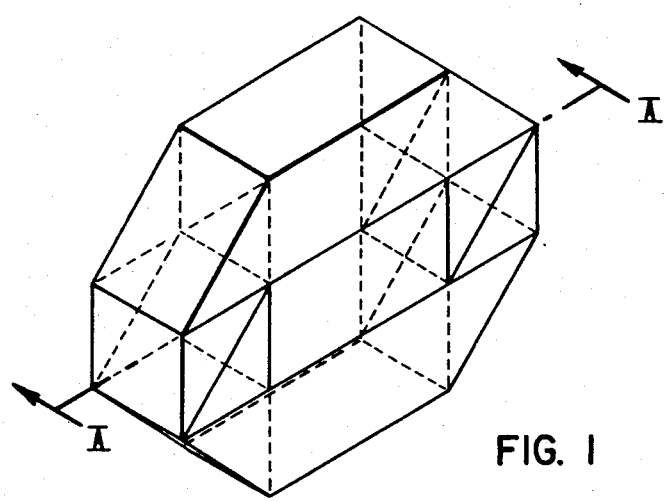
FIG. 1 is a three dimensional sketch of one embodiment of electro-optical apparatus suitable for illustrating one aspect of the present invention.
Figure 7:
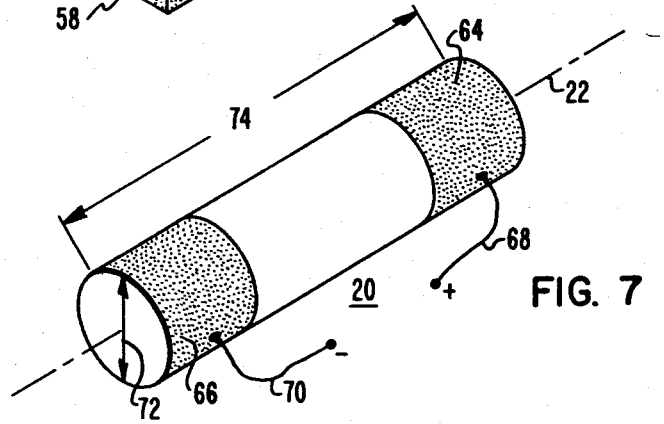
Figure 8:
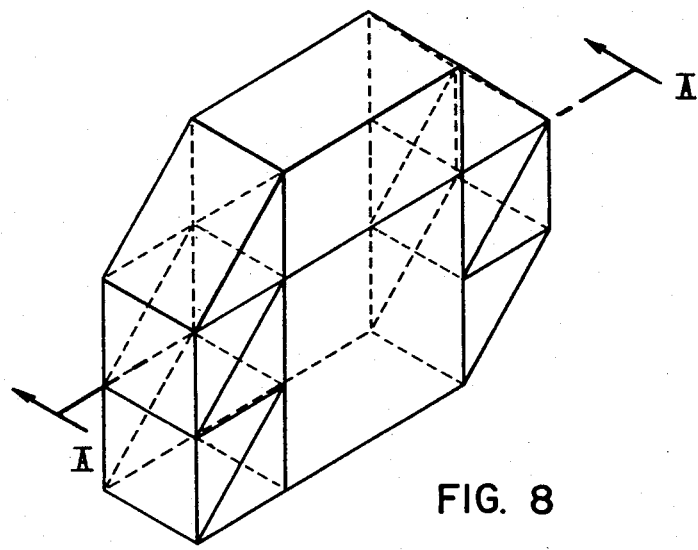
FIG. 8 is a three dimensional sketch of another embodiment of electro-optical apparatus for illustrating the one aspect of the present invention.

It is understood, moreover, that the longitudinal modulation electro-optical cell, as illustratively shown in FIG. 7, may also be used in the preferred embodiments of FIGS. 1 and 8 without deviating from applicant's inventive principles. The conductive surfaces 64 and 66 of the alternate electro-optical cell of FIG. 7 may be metallic bands at each end of the cylindrical electro-optical cell 20, and similar to the device of FIG. 6, electrical connections 68 and 70 may be respectively coupled thereto to accordingly provide a desired voltage potential thereacross. Likewise, the polarization modulation effected by the longitudinal electro-optical cell is generally commensurate with the voltage potential applied across the electrical connections 68 and 70. Here again, in one example, the electrical conductors 64 and 66 may be metal bands squeezed around the cylindrical cell of FIG. 7 with the attempt made to eliminate all air gaps at the interface therebetween. Another example and one which is somewhat considered easier is to form the conductive surfaces by painting on a liquid composition of conductive silver material. Typical dimensions of the cylindrical electro-optical cell includes a diameter of around 11 millimeters and a longitudinal length 74 of approximately 22 millimeters, for example.

Further included in the plurality of optical elements are two truncated roof prisms 76 and 78 which may be of the type commonly referred to as passive glass internal reflection prisms, for example. The roof prisms 76 and 78 may be configured with respect to the polarizers 26 and 36 to provide optical coupling therebetween. More specifically, the prism 76 may have a base surface 80 which provides an exit and entrance aperture for light beams, and two hypotenuse sides 82 and 84 which provide total internal reflection surfaces for light beams. Similarly, the prism 78 also may have a base 86 and two hypotenuse sides 88 and 90 which are provided for identical corresponding functional purposes. The truncated roof prism 76 may be configured with its base 80 in juxtaposition with the second surfaces 32 and 44 of the first and second polarizers 26 and 36, respectively. The hypotenuse side 82 may be configured in a parallel alignment substantially with the incidence surface 28 of the first polarizer 26. The other hypotenuse side 84 may have an inclined alignment at a predetermined angle 92 say on the order of 90°, for example, with the incidence surface 38 of the second polarizer 36. The other truncated roof prism 78 may be similarly configured with its base surface 86 in juxtaposition with the fourth surfaces 46 and 48 of the first and second polarizers 26 and 36, respectively. In addition, the hypotenuse side 90 may have a parallel alignment substantially with the incidence surface 38 of the second polarizer 36 and the other side 88 may be in an inclined alignment at a predetermined angle 94 also around 90°, for example, with the incidence surface 28 of the first polarizer 26.

Figure 3A:
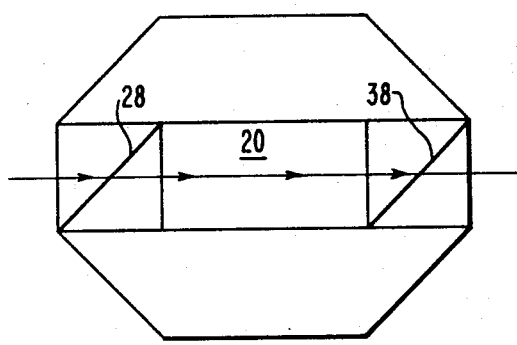
FIGS. 3A and 3B illustrate a first set of optical paths as guided by the electro-optical apparatus of FIG. 1.
Figure 3B:
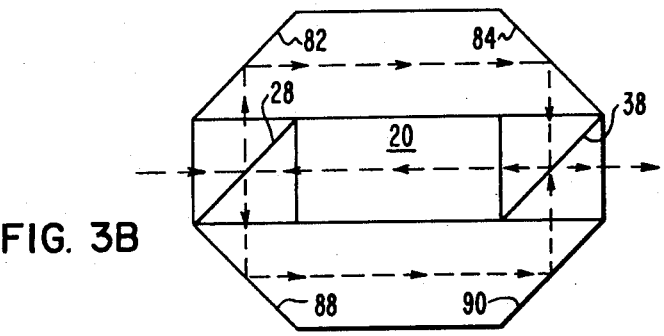

The configuration of optical elements as described in connection with the embodiment of FIG. 2 provides for two sets of optical paths through which to guide the first and second light beam components formed from the first polarizer 26. An example of one set of optical paths for the first and second light beam components is shown in the FIGS. 3B and 3A, by the dashed and solid lines, respectively. For the present case, the two planes of polarization may be thought of as being parallel and perpendicular to their plane of incidence. In FIG. 3B, the first component, which may be considered perpendicular to the incidence plane, is denoted as flowing through a dashed line optical path; and in FIG. 3A, the second light beam component, which may be considered parallel to the incidence plane, is shown as flowing through a solid line path.

For the one extreme state, wherein the electro-optical cell 20 is unenergized, the first light beam component may follow an optical first path which couples sequentially the incidence surface 28, the side 82, the side 84, the incidence surface 38, through the electro-optical cell 20 along the longitudinal axis 22 thereof, the incidence surface 28, the side 88, the side 90, the incidence surface 38, and exiting the third or exit aperture surface of the second polarizer 36 along the optical axis 24. In contrast, as shown in FIG. 3A, the second light beam component may flow through a second path along the optical axis 24 through the incidence surface 28, through the electro-optical cell 20 along its longitudinal axis 22, and through the incidence surface 38 exiting the third surface of the second polarizer 36 substantially colinear with the first path.

Accordingly, the extreme case on the other end of the spectrum involves energization of the electro-optical cell 20 to effect a half-wave length retardation of the light beams passing therethrough along the longitudinal axis thereof to produce a 90°-rotation of the plane of polarization of a light beam. For example, with the electro-optical cell in this energization state, the first component passing in one direction through the electro-optical cell 20 along its longitudinal axis 22 may undergo a 90°-rotation of the plane of polarization and become polarized in like relationship to the second component; similarly, the second component passing through the electro-optical cell 20 colinearly in an opposite direction may undergo a 90°-rotation of the plane of polarization and become polarized in like relationship to the first component. These manifestations are exhibited in FIGS. 4A and 4B.

Figure 4A:
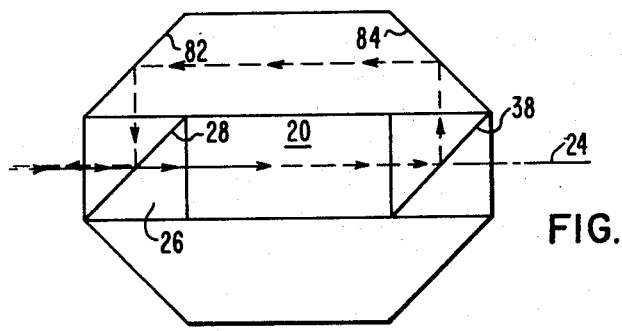
FIGS. 4A and 4B illustrate a second set of optical paths as guided by the electro-optical apparatus of FIG. 1.

The optical paths exhibited by the solid and dashed lines in the Figures of 4B and 4A may constitute a second set of third and fourth optical paths for the first and second polarized light beam components. For example, in FIG. 4B, as the first component is polarized by the polarizer 26, it is reflected from the incidence surface 28 included therein and projected sequentially to the hypotenuse side 82, the hypotenuse side 84, and the incidence surface 38, thereafter along the optical axis 24 passing through the electro-optical cell 20. With the cell 20 energized at one-half wavelength retardation, the first light beam component undergoes a 90°-rotation of the plane of polarization as it passes therethrough and emerges therefrom with a polarization in like relationship to the first component, as denoted by the solid line, whereupon it is passed through the incidence plane 28 of the first polarizer 26 back along the optical axis 24 to its source. In the example of FIG. 4A, the first component enters the first polarizer 26 and is passed through the incidence surface 28 thereof and thereafter guided along the longitudinal axis of the electro-optical cell 20 which is energized to effect a one-half wavelength retardation thereof. When emerging from the cell 20, the first light beam component becomes polarized in like relationship to the second light beam component, as denoted by the dashed line, and therefore, is guided along the fourth optical path which includes the surfaces 38, 84, 82, and 28, thus providing for an exit path colinear with the third path along the optical axis 24.

While FIGS. 3A, 3B and FIGS. 4A, 4B are illustrative of two possible sets of optical paths through which the first and second light beam components may be guided by the plurality of optical elements as described in connection with the embodiment of FIG. 2, it is understood that the sets of optical paths are not mutually exclusive in carrying the light beam components therethrough. That is to say if, for example, the electro-optical cell 20 is in an energization state providing for a half-wave retardation of the light beam components passing along the longitudinal axis thereof, then substantially all of the first and second light beam components will be guided along the paths described in connection with FIGS. 4A and 4B. Accordingly, if the electro-optical cell 20 is unenergized in the state providing for no retardation, then substantially all of the first and second light beam components will follow the set of optical paths as described in connection with the FIGS. 3A and 3B. However, should the electro-optical cell 20 be energized in a state somewhere in between zero retardation and one-half wavelength retardation, then the first and second light beam components may be split into first and second amounts between the set of optical paths of FIGS. 3A and 3B and the set of optical paths of FIGS. 4A and 4B commensurate with the energization of the electro-optical cell 20. In this case, first predetermined amounts of the first and second light beam components may be combined at the incidence surface 38 of the second polarizer 36 to reform a first predetermined amount of the randomly polarized light beam which is exited along the optical axis 24 through the third surface thereof, and directed away from its source. In addition, second amounts of the first and second light beam components may be combined at the incidence surface 28 to form a second predetermined amount of the randomly polarized light beam which is exited along the optical axis 24 through the first surface of the first polarizer 26 and returned to its source.

The first and second predetermined amounts of the randomly polarized light beam are formed primarily as a function of the energization state of the electro-optical cell 20 and as a result of the configuration of the plurality of optical elements surrounding the cell 20.

Figure 4B:
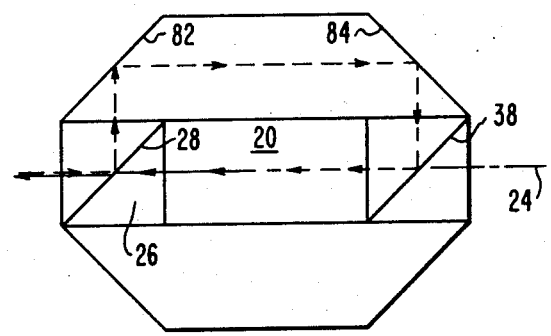

While the set of optical paths described in connection with the embodiments of FIGS. 4A and 4B are of substantially equal length, this does not appear to be the case for the other set of optical paths as described in connection with the embodiment of FIGS. 3A and 3B. Apparently, the second light beam component is guided through the optical elements in an optical path which is much shorter than the optical path provided for the first light beam component (refer to the contrasting solid and dashed light beam paths shown in FIGS. 3A and 3B). For very short light beam pulsations, say on the order of one-tenth of a nanosecond, for example, the differences in path lengths may effect a double pulse of light beam exiting at the third surface of the second polarizer 36. To rectify this undesirable situation, a second or alternative embodiment has been proposed and will be described in the following paragraphs herebelow.

Figure 9:
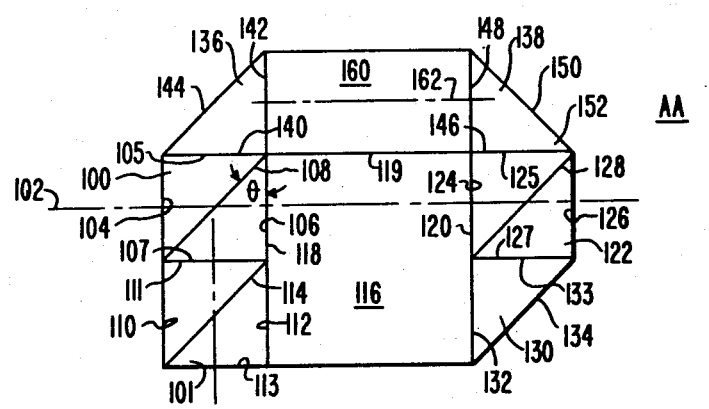
FIG. 9 is a cross-sectional diagram of the embodiment, depicted in FIG. 8, as viewed along an AA cut.

As has been stated above, a three-dimensional view of the second embodiment is shown in FIG. 8, however, for the purposes of this description, a cross-sectional cut along the AA view as shown in FIG. 9 will be used. Referring to FIG. 9, a first beam splitter/combiner polarizer 100 may be disposed along a first optical axis 102. The polarizer 100 may have first, second, third and fourth surfaces enumerated as 104, 105, 106, and 107, respectively, the first surface 104 being the entrance operative of the beam of randomly polarized light rejected along axis 102. The first and third surfaces and second and fourth surfaces may be substantially parallel pairs. In addition, the first polarizer 100 may have a polarizing incidence surface 108 included therein inclined at a polarization angle $\theta$, say on the order of 45°, for example, with respect to the first optical axis 102. A second beam splitter/combiner polarizer 101 also may have first, second, third and fourth surfaces enumerated as 110, 111, 112 and 113, respectively, and include therein an incidence surface enumerated as 114. The second polarizer 101 may be aligned with the first polarizer 100 such that: the first and third surfaces may be disposed substantially in the same respective planes; the second surface of 101 may be aligned in juxtaposition with the fourth surface of 100; and the incidence surface 114 may be substantially in parallel with the incidence surface 108. A one-half wavelength retardation plate 116 may be disposed along the optical axis 24 in tandem with the first and second polarizers 100 and 101, respectively. The plate 116 may include first, second, and third surfaces enumerated as 118, 119 and 120. The plate 116 may be positioned such that the first surface 118 thereof may be aligned in juxtaposition with the third surfaces 106 and 112 which are positioned substantially in the same plane. Moreover, the surface 120 of 116 may be aligned opposite the surface 118 and substantially in parallel therewith. The surface 119 may couple the surfaces 118 and 120 and be aligned substantially in parallel with the optical axis 102.

In addition, a third beam splitter/combiner polarizer 122 may be positioned along the optical axis 102 in tandem with the plate 116. The polarizer 122 may also include first, second, third and fourth surfaces enumerated as 124, 125, 126 and 127, respectively, and further include an incidence surface 128 therein which is inclined substantially in parallel with the incidence surfaces 108 and 114. A first prism 130 having three sides 132, 133 and 134 may be disposed in the embodiment such that the side 132 thereof may be aligned substantially in the same plane as the first surface 124 of the third polarizer 122. In addition, the side 133 may be aligned in juxtaposition with the fourth surface 127 of the polarizer 122. Furthermore, the third side 134 of 130 may be aligned in a plane which is substantially in parallel with the incidence surface 128. Two other prisms 136 and 138 may be additionally disposed within the embodiment, each prism including three sides enumerated as 140, 142 and 144 for the prism 136 and 146, 148, and 150 for the prism 138. The sides 142 and 148 of the two additional prisms 136 and 138 may be aligned substantially in parallel with the plane of the third surfaces 106 and 112 and the plane of the first surface 124 and prism side 132, respectively. The sides 140 and 146 of the prisms 136 and 138 may be respectively aligned in juxtaposition with the second surfaces 105 and 125. Moreover, the third side 144 of prism 136 may be aligned in parallel substantially with the incidence surface 108, and the third side 150 of the prism 138 may be inclined at a predetermined angle 152 say on the order of 90°, for example, with respect to the incidence surface 128.

Finally, an electro-optical cell 160 may be disposed within the embodiment between the sides 142 of prism 136 and 148 of prism 138, having its longitudinal axis 162 in parallel substantially with the optical axis 102. It is understood that the electro-optical cell 160 may be of a conventional type similar to those described in connection with the embodiments of FIG. 6 and FIG. 7 presented hereabove. All other optical elements such as the beam splitter/combiner polarizers 100, 102, and 122, the one-half wavelength retardation plate 116, and triangular prisms 130, 136 and 138 may be of a conventional passive glass variety, the details of which being by themselves not a part of the present invention other than having certain prespecified characteristics for performing the desired function of the assembled apparatus combination. For example, the incidence surfaces of the polarizers may be inclined at predetermined polarizing angle and include a dielectric coating such to effect the desired reflection and transmission polarization division of the first and second light beam components which is pertinent to the present embodiment. In addition, certain surfaces of the optical elements may be prepared by polishing, for example, to permit entrance and exiting properties for guiding the light beams along their prespecified optical paths as will be described in greater detail herebelow. Certain other surfaces like the sides 134, 144 and 150 of the prisms 130, 136 and 150, respectively, may be additionally prepared by polishing, for example, to offer a total internal reflection surface for guiding the first and second light beam components along their prespecified optical paths.

Figure 10A:
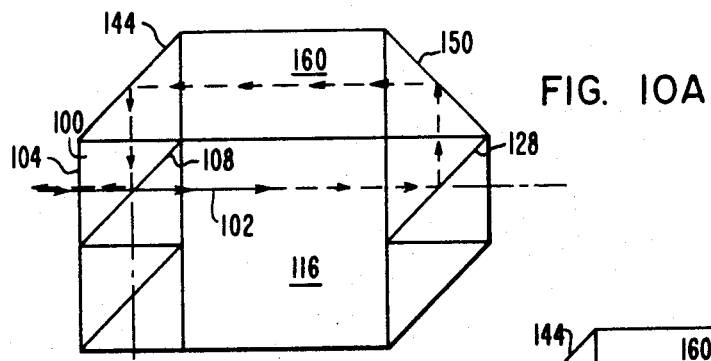
FIGS. 10A and 10B illustrate a first set of optical paths as guided by the electro-optical apparatus of FIG. 8.
Figure 10B:
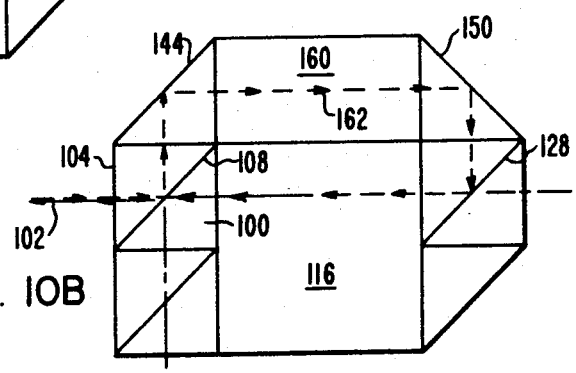

Typical sets of guided optical paths of substantially equal lengths are illustratively depicted in the FIGS. 10A and 10B and FIGS. 11A and 11B. For the extreme case, in which the electro-optical cell 160 is substantially unenergized thus providing essentially no retardation to either of the first and second light beam components, the first and second light beam components as depicted by dashed and solid lines are guided to follow the paths as depicted in FIGS. 10B and 10A, respectively. For example, in FIG. 10B the first light beam component, as depicted by the dashed line, is reflected from the incidence surface 108 of the first polarizer 100. Thereafter, the path flows sequentially to the side 144, through the electro-optical cell 160 along its longitudinal axis 162, the side 150, the incidence surface 128 and into the retardation plate 116 along the optical axis 102. In the one-half wavelength retardation plate 116, the first component undergoes a 90°-rotation of the plane of polarization and becomes polarized in like relationship to the second light beam component as denoted by the solid line emerging from the plate 116. The path then continues through the incidence surface 108 and continues along the optical axis 102 back to its source.

The second optical path of the first set may be as typically shown in FIG. 10A wherein the second light beam component, as depicted by the solid line, passes through the incidence surface 108 of the first polarizer 100 and enters the plate 116 generally along the optical axis 102. Therein, the first light beam component undergoes a 90°-rotation of the plane of polarization and becomes polarized in like relationship to the first light beam component as depicted by the dashed line emerging from the plate 116 along the optical axis 102. The second optical path continues to the following in sequential order: the incidence surface 128, the side 150, along the longitudinal axis 162 of the electro-optical cell 160, the side 144, and the incidence surface 108. The second path exits the first polarizer 100 through the face 104 along the optical axis 102 colinearly with the first path. At the point of emergence in the general area of the incidence plane 108, the first and second light beam components may be combined to reform the randomly polarized light beam which may be returned back to its source (not shown) along the optical axis 102.

Figure 11A:
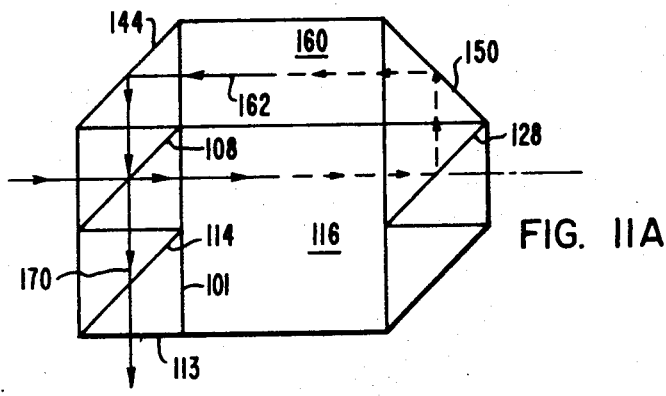
FIGS. 11A and 11B illustrate a second set of optical paths as guided by the electro-optical apparatus of FIG. 8.
Figure 11B:
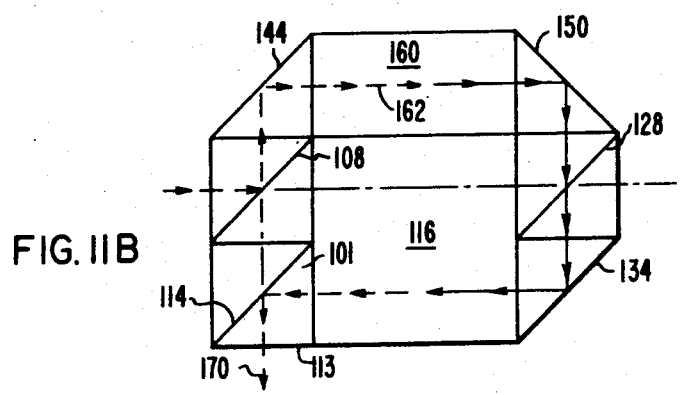

In the other extreme case, wherein the electro-optical cell 160 is energized to effect a one-half wavelength retardation of a light beam passing along the longitudinal axis 162 thereof, which, in effect, produces a 90° rotation of the plane of polarization of the light beam. Typical examples of the set of optical paths under these conditions for the alternate embodiment is shown in FIGS. 11A and 11B. Referring to 11B, the first component is reflected by the incidence surface 108 and then the side 144 to enter the electro-optical cell 160 along its longitudinal axis 162. In the cell 160, the first light beam component is retarded to fully modulate the polarization which effects a light beam component with the characteristics of the second light beam component as depicted by the solid line emerging from the cell 160. Thereafter, the light beam component is guided along a path including the side 150, through the incidence surface 128, the side 134, and into the one-half wavelength retardation plate 116. During the passage through the plate 116, the light beam undergoes another one-half wavelength retardation and becomes polarized back to the first light beam component as shown by the changing of the solid line to the dashed line. Emerging from the plate 116, the dashed line path continues to the incidence surface 114 and thereafter is reflected from the second polarizer 101 through the surface 113 along a second optical axis 170.

In contrast, the other path of the second set of optical paths, as shown in FIG. 11A, permits the second light beam component, as denoted by the solid line, to pass initially through the incidence surface 108 and enter the plate 116 wherein it undergoes a polarization modulation producing a light beam having the characteristics of the first light beam component, as denoted by the dashed line emerging the plate 116. The path then continues from the incidence surface 128 to the side 150 and then through the electro-optical cell 160 along the longitudinal axis 162 thereof. With the electro-optical cell energized to produce a one-half wavelength retardation in the light beam component, the light beam component passing therethrough is reconverted to have the polarization characteristics of the second light beam component as denoted by the solid line emerging from the electro-optical cell 160. Upon emerging from the cell 160, the path continues to the side 144 wherein it is reflected along the second optical axis 170 and thereafter passes sequentially through the incidence surfaces 108 and 114. Upon passing through the incidence surface 114, the second light beam component is combined with the first light beam component to reform the randomly polarized light beam which exits the second polarizer 101 through the fourth surface 113 thereof.

While only the extreme cases have been described in connection with the embodiment of FIG. 9, it is understood that all of the first and second light beam components do not necessarily exclusively flow through either one or the other of the first and second sets of optical paths in all cases. For the case in which the electro-optical cell 160 is energized electronically somewhere between the two extremes, first predetermined amounts of the first and second light beam components may flow through the first set of optical paths and be reflected back along the optical axis 102 to its source as shown in FIGS. 10A and 10B and second predetermined amounts of the first and second light beam components may be guided along the second set of paths to be recombined and exited along a second optical axis 170 diverted away from its source as shown in FIGS. 11A and 11B. In each case, a first predetermined amount of randomly polarized light beam and a second predetermined amount of randomly polarized light beam may be exited from the alternate embodiment along first and second optical axis, 102 and 170, respectively. The predetermined first and second amounts may for the present embodiment be controlled by the amount of polarization modulation effected on the first and second light beam components passing through the electro-optical cell 160 which is generally commensurate with the amount of electrical potential applied thereacross.

In accordance with another aspect of applicant's invention, the electro-optical apparatus depicted in the embodiments of FIGS. 2 and 9 may be combined in combination with the elements of a laser system to provide for Q modulation in the laser cavity thereof. Typical embodiments of a laser system combination including the electro-optical apparatus embodiments of FIGS. 2 and 9 are shown in the FIGS. 5 and 12, respectively.

In each of the embodiments (i.e. FIGS. 5 and 12), a laser rod 180 may be positioned longitudinally along an optical axis 182 for generating a beam of randomly polarized coherent light along the optical axis 182. The laser rod 180 includes first and second opposite ends 184 and 186, respectively, with respect to the optical axis 182.

For the purposes of stimulating the laser rod 180 to a predetermined energy level, a conventional pump lamp 188 may be disposed within a well-known pumping enclosure 190. In a customary manner, the pump lamp 188 may be driven by a conventional power source 192. A total reflection mirror 194 may be disposed along the optical axis 182 a first predetermined distance 196 from the first end 184 of the laser rod 180. In the embodiment depicted in FIG. 5, an electro-optical Q modulator 198, similar to the type described in connection with the embodiment of FIG. 2, may be disposed along the optical axis 182 a second predetermined distance 200 from the second end 186 of the laser rod 180. Similarly, in the embodiment depicted in FIG. 12, the Q modulator 198 disposed along the optical axis 182 the second predetermined distance 200 from the second end 186 of the laser rod 180 may be of the type described in connection with the embodiment of FIG. 9, for example.

In each of the aforementioned laser embodiments, the electro-optical cells 20 and 160 of their respective Q modulator 198 may be operative in an energized state to modulate the polarization of a light beam passing along the longitudinal axis thereof. A conventional Q switch driver 202 in each case may be utilized for energizing electronically the electro-optical cell 20 or 160 to a predetermined energization state commensurate with the desired polarization modulation level. The plurality of optical elements embodying the Q modulator 198 are configured in each case for polarizing the randomly polarized light beam generated by the laser rod 180 into first and second light beam components having first and second planes of polarization, respectively, and for guiding the first and second light beam components through the electro-optical cell in each case colinearly along the longitudinal axis thereof much the same as described hereabove in connection with the embodiments of the FIGS. 3A, 3B, 4A and 4B and FIGS. 10A, 10B, 11A and 11B.

Accordingly, the plurality of optical elements constituting the Q modulator 198 are configured to recombine the first predetermined amounts of the first and second light beam components which have passed through the electro-optical cell, in each case, to reform a first predetermined amount of the randomly polarized light beam which may be reflected back to the laser rod 180 along the optical axis 182. In addition, the optical element configuration of the Q modulator 198, in each case, provides for combining second predetermined amounts of the first and second light beam components which have passed through the electro-optical cell 20 or 160 to reform a second predetermined amount of the randomly polarized light beam which is transmitted along a second axis designated as output, away from the axis of the laser rod 180. The reflected-first and transmitted-second amounts of the randomly polarized light beams may be formed as a function of the polarization modulation level of the electro-optical cells 20 or 160. Thus, the Q of the laser optical cavity of the embodiments of FIG. 5 and FIG. 12, which is primarily dependent on the amount of randomly polarized light reflected back to the laser rod 180 along the optical axis, 182, is modulated by the electronically energized state of the electro-optical cells 20 or 160 as the case may be.

Figure 5:
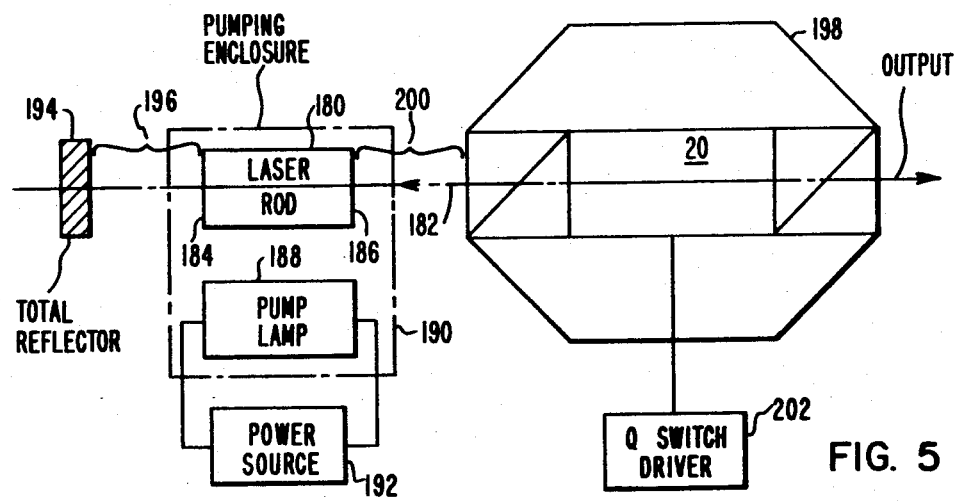
FIG. 5 is an illustration of a laser system including the electro-optical apparatus, depicted in FIG. 1, as an element thereof.
Figure 12:
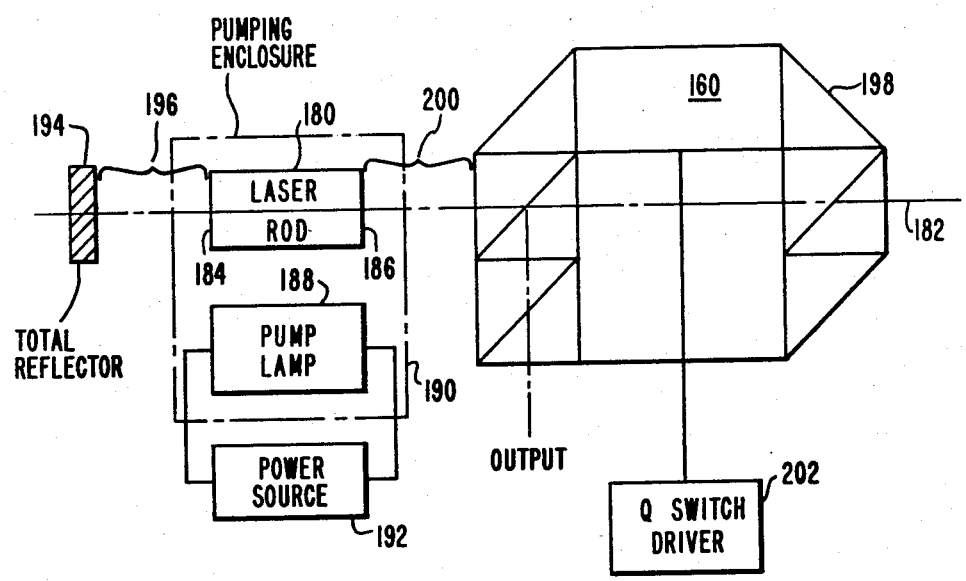
FIG. 12 is an illustration of a laser system including the electro-optical apparatus, depicted in FIG. 8, as an element thereof.

It is well to note the contrasting features offered by each of the laser combination embodiments depicted in FIGS. 5 and 12. For example, in the embodiment depicted in FIG. 5, fewer optical elements are used for the Q modulator configuration 198; however, this provides for different length guided optical paths for the first and second polarized light beam components as transmitted through the Q modulator (see FIGS. 3A and 3B). Reiterating, should the pulsed transmissions of the laser be on the order of one-tenth of a nanosecond, for example, then there is the possibility, in this embodiment, to produce an undesirable double pulse as a result. On the other hand, the embodiment depicted in FIG. 12 while using a greater number of optical elements does provide equal length paths for the first and second sets of first and second light beam components under both the conditions of reflection and transmission thus avoiding the possibility of a double pulse being formed at the transmission output for the high-speed transmission case.

In a typical operation of either the embodiment depicted in FIG. 5 or the embodiment depicted in FIG. 12, the laser pumping means including the pump lamp 188 and power source 192 stimulates the laser rod 180 to a predetermined energization level. During this time, the Q switch driver 202 provides the proper energization state for the electro-optical cell of the Q modulator to provide substantially 100% light-beam transmission therethrough to the output. Under these conditions, the laser combination is in a low Q-state because of the high transmission afforded by the Q modulator 198.

When the laser rod achieves its predetermined energy level, the Q switch driver 202 may provide the appropriate energy level to the electro-optical cell 20 or 160 to effect a substantially 100% reflection of the randomly polarized light beam along the optical axis 182 to the laser rod 180. The reflected light beam may pass through the laser rod 180 providing for an amplification of the stimulated light energy and may exit the laser rod at the surface 184 continuing along the optical path 182 to the total reflection mirror 194. Thereafter, the light beam may be reflected back to the laser rod 180 along the optical axis 182 re-entering the laser rod 180 at the surface 184. In passing through the laser rod 180 for a second time, the light beam may again be amplified to a higher stimulated energy level and may exit the laser rod 180 at the surface 186. The light beam thereafter may continue to be reflected between the Q modulator 198 and total reflector 194 along the optical axis 182 until it passes through the laser rod 180 a predetermined number of times. Under this condition, the laser combination is in a high Q-state because of the high reflection of the randomly polarized light beam in the laser cavity.

At a prespecified time, during the lasing operation, the Q switch driver 202 may apply a predetermined voltage potential to the electro-optical cell 20 or 160 in the Q modulator 198 to permit a prespecified amount of randomly polarized light beam energy to be coupled from the Q modulator 198 along the corresponding output axis. The amount of light coupled from the output and the amount of light reflected back to the laser rod 180 may be consistent with the aforementioned first and second predetermined amounts of randomly polarized light beams which may be commensurately adjusted by the polarization modulation of the electro-optical cells induced electronically by the Q switch driver 202.

With regard to the laser combination as described in connection with the embodiments of FIGS. 5 and 12, applicant's inventive features offer many advantages. For example, only one randomly polarized beam of light is guided along the optical axis 182 of the laser combination and through the electro-optical apparatus of the Q modulator thereby avoiding any thermal optic distortion effects. In addition, since only one beam of light is passed colinearly along the longitudinal axis of the electro-optical crystal, a much smaller crystal may be used for polarization modulation. Furthermore, since the Q modulator provides for reflection of the randomly polarized light beam, it in essence functions as a reflective mirror thereby eliminating the necessity of such a reflection mirror in the laser cavity which is customarily required. Moreover, no special birefringence crystalline material such as calcite, for example, is required for light polarization purposes. All of the optical elements used in the electro-optical apparatus configuration may be inexpensive glass elements except, of course, for the electro-optical crystal contained therein.

The embodiments described hereabove in connection with FIGS. 1 through 12 are intended to present the broad principles of applicant's invention. However, it is understood that modifications and additions may be made to these embodiments without deviating from applicant's subject invention. Accordingly, applicant's invention should not be limited to any one embodiment but rather construed in connection with the broad scope and breadth of the claims heretofollow.

I claim:

1. Electro-optical apparatus operative electronically to modulate a randomly polarized beam of light projected along an optical axis from a source of coherent light, said apparatus comprising:

an electro-optical cell operative in an energized state to modulate the polarization of a light beam passing along a predetermined axis thereof; and a plurality of optical elements configured for polarizing said randomly polarized light beam, incident thereupon along said optical axis, into first and second light beam components having first and second planes of polarization, respectively, and for guiding said first and second components through said electro-optical cell colinearly along the predetermined axis thereof, said plurality of optical elements further configured for combining first predetermined amounts of said first and second light beam components which have passed through said electro-optical cell to reform and exit a first predetermined amount of the randomly polarized light beam along a first axis therefrom, and for combining second predetermined amounts of said first and second light beam components which have passed through said electro-optical cell to reform and exit a second predetermined amount of the randomly polarized light beam along a second axis therefrom.

2. The electro-optical apparatus of claim 1 wherein the plurality of optical elements includes an optical means for polarizing said randomly polarized beam of light, incident thereupon along the optical axis, into first and second light beam components having first and second planes of polarization, respectively, by reflecting said first light beam component therefrom and by transmitting said second light beam component therethrough.

3. The electro-optical apparatus of claim 2 wherein the optical polarizing means is a beam splitter/combiner polarizer which is operative to polarize the randomly polarized light beam into first and second light beam components having their respective first and second planes of polarization orthogonally aligned.

4. The electro-optical apparatus of claim 1 wherein the plurality of optical elements are further configured to guide the first and second light beam components to enter said electro-optical cell colinearly along the predetermined axis thereof in opposite directions.

5. The electro-optical apparatus of claim 1 wherein the plurality of optical elements are configured for forming and exiting the first and second predetermined amounts of the randomly polarized light beams along the first and second axis, respectively, in accordance with the polarization modulation effected by the electro-optical cell on the first and second light beam components passing colinearly therethrough.

6. The electro-optical apparatus of claim 1 wherein the plurality of optical elements are configured for guiding the first predetermined amounts of the first and second light beam components in a first set of respectively corresponding optical paths, which terminate in a first colinear path at one exit surface of said apparatus, and for guiding the second predetermined amounts of the first and second light beam components in a second set of respectively corresponding optical paths, which terminate in a second colinear path at another exit surface of said apparatus, said first and second predetermined amounts of the first and second light beam components flowing in their respective first and second sets of optical paths being a function of the polarization modulation effected by said electro-optical cell, said first and second colinear termination paths rendering the combination of the first predetermined amounts of the first and second light beam components and the second predetermined amounts of the first and second light beam components, respectively, to form the corresponding amounts of the randomly polarized light beam which exit the apparatus at the exit surface respectively associated therewith.

7. The electro-optical apparatus of claim 6 wherein the plurality of optical elements includes a first beam splitter/combiner polarizer having an incidence surface therein which is inclined with respect to the optical axis at a predetermined polarization angle, said first beam splitter/combiner polarizer having a first surface for providing entrance of the randomly polarized beam along the optical axis, a second surface for exiting the first light beam component, reflected from said incidence surface, and a third surface for exiting the second light beam component transmitted through said incidence surface along the optical axis.

8. The electro-optical apparatus of claim 7 wherein the beam splitter/combiner polarizer polarizes the randomly polarized light beam into first and second light beam components having their respective first and second plane of polarization orthogonally aligned.

9. The electro-optical apparatus of claim 7 wherein the electro-optical cell is configured in tandem with the first beam splitter/combiner polarizer; wherein the predetermined axis of the electro-optical cell is its longitudinal axis which is substantially colinear with the optical axis; and wherein the plurality of optical elements includes:
a second beam splitter/combiner polarizer configured in tandem with the electro-optical cell along the optical axis and having an incidence surface therein which is inclined substantially parallel to the incidence surface of the first beam splitter/combiner polarizer, said second beam splitter/combiner polarizer having first and third surfaces, which are substantially parallel to their respective surfaces of the first beam splitter/combiner polarizer, and having a second surface which is oriented in the same plane substantially as the second surface of the first beam splitter/combiner polarizer;
said first and second beam splitter/combiner polarizers each including a fourth surface which is substantially parallel to the second surface thereof; and
two truncated roof prisms each having a base surface, which provide an exit and entrance aperture for light beams, and two hypotenuse sides, which provide total internal reflection surfaces for light beams, one truncated roof prism being configured with its base surface in juxtaposition with the second surfaces of the first and second beam splitter/combiner polarizer with one hypotenuse side in a parallel alignment substantially with the incidence surface of the first polarizer and the other hypotenuse side in an inclined alignment at a predetermined angle with the incidence surface of the second polarizer, and the other truncated roof prism being configured with its base surface in juxtaposition with the fourth surfaces of the first and second beam splitter/combiner polarizers with one hypotenuse side in a parallel alignment substantially with the incidence surface of the second polarizer and the other hypotenuse side in an inclined alignment at a predetermined angle with the incidence surface of the first polarizer.

10. The electro-optical apparatus of claim 9 wherein the first guided set of optical paths includes:
a first path which flows to the following in sequential order: the incidence surface of the first polarizer, the one side and then the other side of the one truncated prism, the incidence surface of the second polarizer, the incidence surface of the first polarizer, the other side and then the one side of the other truncated prism, the incidence surface of the second polarizer, and exiting the third surface of the second polarizer along the optical axis; and
a second path which flows along the optical axis through the incidence surface of the first polarizer, through the electro-optical cell, and through the incidence surface of the second polarizer, exiting the third surface of the second polarizer substantially colinear with the first path; and
wherein the second set of optical paths includes:
a third path which flows to the following in sequential order; the incidence surface of the first polarizer, through the electro-optical cell, the incidence surface of the second polarizer, the other and then the one side of the one truncated prism, the incidence surface of the first polarizer, and exiting the first surface of the first polarizer; and
a fourth path which flows from the incidence surface of the first polarizer to the one and other sides of the one truncated roof prism, to the incidence surface of the second polarized, through the electro-optical cell, through the incidence surface of the first polarizer, and exiting the first surface of the first polarizer substantially colinear with the third path.

11. The electro-optical apparatus of claim 6 wherein the optical paths of the first set are of substantially equal lengths; and wherein the optical paths of the second set are of substantially equal lengths.

12. The electro-optical apparatus of claim 6 wherein the first beam splitter/combiner polarizer includes a fourth surface which is substantially parallel to the second surface thereof; and wherein the plurality of optical elements includes:
a second beam splitter/combiner polarizer having first and third surfaces lying substantially in the same respective planes as the first and third surfaces of the first beam splitter/combiner polarizer, and having a second surface aligned in juxtaposition with the fourth surface of the first polarizer, said second polarizer further including an incidence surface therein which is substantially parallel to the incidence surface of the first polarizer;
a one-half wavelength plate having first and second opposite and substantially parallel surfaces transverse to the optical axis and a third surface coupling said first and second surfaces and lying substantially parallel to the optical axis, said first surface of said plate being aligned in juxtaposition with the plane of the third surface of the first and second polarizers;
a third beam splitter/combiner polarizer having first and third surfaces aligned substantially in parallel with the first and third surfaces of the first polarizer, and second and fourth surfaces lying substantially in the same respective planes as the second and fourth surfaces of the first polarizer, said third polarizer further including an incidence surface therein which is substantially parallel to the incidence surfaces of the first and second polarizers;
a first prism having a first side lying substantially in the same plane as said first surface of said third polarizer, a second side aligned in juxtaposition with said fourth surface of said third polarizer, and a third side inclined substantially parallel to the incidence surface of said third polarizer, said third side providing a total internal reflection surface;
said plane of the first surface of said third polarizer and first side of said first prism being aligned in juxtaposition with the second surface of said one-half wavelength plate;
an electro-optical cell aligned longitudinally in juxtaposition with said third surface of said one-half wavelength plate and having the longitudinal axis thereof substantially parallel to the optical axis, said cell including first and second substantially parallel surfaces aligned transverse to said optical axis;
a second prism having a first side aligned in juxtaposition with the second surface of the first polarizer, a second side aligned in juxtaposition with said first surface of said electro-optical cell, and a third side inclined substantially parallel to the incidence surface of the first polarizer, said third side providing a total internal reflection surface;
a third prism having a first side aligned in juxtaposition with the second surface of said third polarizer, a second side aligned in juxtaposition with said second surface of said electro-optical cell, and a third side inclined in a direction transverse to the incidence surface of said third prism, said third side providing a total internal reflection surface.

13. The electro-optical apparatus of claim 12 wherein the first guided set of optical paths includes:
a first path which flows light to the following in sequential order: the incidence surface of the first polarizer, the third side of the second prism, along the longitudinal axis of the electro-optical cell, the third side of the third prism, through the incidence surface of the third polarizer, the third side of the first prism, through the one-half wavelength plate, the incidence surface of the second polarizer, and exiting the fourth surface of the second polarizer; and
a second path which flows light to the following in sequential order: through the incidence surface of the first polarizer along the optical axis, through the one-half wavelength plate, the incidence surface of the third polarizer, the third side of the third prism, through the electro-optical cell along the longitudinal axis thereof, the third side of the second prism, through the incidence surfaces of the first and second polarizers, and exiting the fourth surface of the second polarizer substantially colinear with the first path; and
wherein the second set of optical paths includes:
a third path which flows light to the following in sequential order: through the incidence surface of the first polarizer along optical axis, through the one-half wavelength plate, the incidence surface of the third polarizer, the third side of the third prism, through the electro-optical cell along the longitudinal axis, the third side of the second prism, the incidence surface of the first polarizer, and exiting the first surface of the first polarizer; and
a fourth path which flows light to the following in sequential order: the incidence surface of the first polarizer, the third side of the second prism, through the electro-optical cell along the longitudinal axis thereof, the third side of the third prism, the incidence surface of the third polarizer, through the one-half wavelength plate along the optical axis, through the incidence surface of the first polarizer, and exiting the first surface of the first polarizer substantially colinear with said third path.

14. A laser system having the Q of its optical cavity electronically modulated, said laser comprising:
a laser rod, positioned longitudinally along an optical axis, for generating a beam of randomly polarized coherent light along said optical axis, said laser rod including first and second opposite ends with respect to said optical axis;
a pumping means for stimulating the laser rod to a predetermined energy level;
a total reflection mirror disposed along the optical axis a first predetermined distance from the first end of said laser rod;
an electro-optical Q modulator disposed along the optical axis a second predetermined distance from the second end of said laser rod, said electro-optical Q modulator including:
an electro-optical cell operative in an energized state to modulate the polarization of a light beam passing along a predetermined axis thereof;
means for energizing electronically said electro-optical cell to a predetermined energization state commensurate with a desired polarization modulation level;

a plurality of optical elements configured for polarizing said randomly polarized light beam generated by said laser rod into first and second light beam components having first and second planes of polarization, respectively, and for guiding said first and second light beam components through said electro-optical cell colinearly along said predetermined axis thereof, said plurality of optical elements further configured for recombining first predetermined amounts of said first and second light beam components which have passed through said electro-optical cell to reform a first predetermined amount of the randomly polarized light beam which is reflected back to said laser rod along the optical axis, and for recombining second predetermined amounts of said first and second light beam components which have passed through said electro-optical cell to reform a second predetermined amount of the randomly polarized light beam which is transmitted along another axis away from said laser rod, said reflected-first and transmitted-second amounts of said randomly polarized light beam being formed as a function of the polarization modulation level of said electro-optical cell, whereby the Q of the laser optical cavity, which is dependent on the amount of randomly polarized light reflected along the optical axis back to the laser rod, is modulated by the electronically energized state of the electro-optical cell.

15. The laser system of claim 14 wherein the plurality of optical elements of the Q modulator includes:

an optical means for polarizing said randomly polarized beam of light, incident thereupon along the laser optical axis, into first and second light beam components having first and second planes of polarization, respectively, by reflecting said first light beam component therefrom and by transmitting said second light beam component therethrough.

16. The laser system of claim 15 wherein the optical polarizing means is a beam splitter/combiner polarizer which is operative to polarize the randomly polarized light beam into first and second light beam components having their respective first and second planes of polarization orthogonally aligned.

17. The laser system of claim 14 wherein the plurality of optical elements of the Q modulator are further configured to guide the first and second light beam components to enter said electro-optical cell colinearly along the predetermined axis thereof in opposite directions.

18. The laser system of claim 14 wherein the plurality of optical elements are configured for guiding the first predetermined amounts of the first and second light beam components in a first set of respectively corresponding optical paths, which terminate in a first colinear path at one exit surface of said apparatus, and for guiding the second predetermined amounts of the first and second light beam components in a second set of respectively corresponding optical paths, which terminate in a second colinear path at another exit surface of said apparatus, said first and second predetermined amounts of the first and second light beam components flowing in their respective first and second sets of optical paths being a function of the polarization modulation effected by said electro-optical cell, said first and second colinear termination paths rendering the combination of the first predetermined amounts of the first and second light beam components and the second predetermined amounts of the first and second light beam components, respectively, to form the corresponding amounts of the randomly polarized light beam which exit the apparatus at the exit surface respectively associated therewith.

19. The laser system of claim 18 wherein the optical paths of the first set are of substantially equal lengths and the optical paths of the second set are of substantially equal length.

* * * * *